US010162535B2

(12) United States Patent
Kalos et al.

(10) Patent No.: US 10,162,535 B2
(45) Date of Patent: Dec. 25, 2018

(54) STATISTIC-BASED ISOLATION OF LETHARGIC DRIVES

(71) Applicant: International Business Machines Corporation, Armonk, NY (US)

(72) Inventors: Matthew J. Kalos, Tucson, AZ (US); Karl A. Nielsen, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/615,386

(22) Filed: Jun. 6, 2017

(65) Prior Publication Data

US 2017/0269853 A1 Sep. 21, 2017

Related U.S. Application Data

(63) Continuation of application No. 14/788,756, filed on Jun. 30, 2015, now Pat. No. 9,747,042.

(51) Int. Cl.
G06F 3/06 (2006.01)
G06F 11/34 (2006.01)
G06F 11/30 (2006.01)

(52) U.S. Cl.
CPC .......... G06F 3/0611 (2013.01); G06F 3/0653 (2013.01); G06F 3/0689 (2013.01); G06F 11/3034 (2013.01); G06F 11/3419 (2013.01); G06F 11/3485 (2013.01)

(58) Field of Classification Search
CPC .... G06F 3/0611; G06F 3/0653; G06F 3/0689; G06F 3/06
USPC ........................................................ 711/170
See application file for complete search history.

(56) References Cited

U.S. PATENT DOCUMENTS

| 6,397,347 | B1 | 5/2002 | Masuyama et al. |
| 6,914,901 | B1* | 7/2005 | Hann .................. H04L 12/5601 370/366 |
| 7,383,400 | B2 | 6/2008 | Eng et al. |
| 7,389,396 | B1 | 6/2008 | Goel et al. |
| 7,496,796 | B2 | 2/2009 | Kubo et al. |
| 7,870,345 | B2 | 1/2011 | Daud et al. |
| 7,917,810 | B2 | 3/2011 | Piszczek et al. |
| 7,971,093 | B1 | 6/2011 | Goel et al. |
| 8,090,992 | B2 | 1/2012 | Sundrani et al. |
| 8,185,784 | B2 | 5/2012 | McCombs et al. |
| 8,285,960 | B2* | 10/2012 | Pyeon .................. G11C 7/1048 711/168 |

(Continued)

OTHER PUBLICATIONS

List of IBM Patents or Patent Applications Treated As Related.

(Continued)

Primary Examiner — Pierre Miche Bataille
(74) Attorney, Agent, or Firm — Zilka-Kotab, P.C.

(57) ABSTRACT

A method is provided for identifying a lethargic drive. The method includes identifying a timing bucket unique to a drive located in a redundant array of independent disks (RAID) configuration, computing a delta-count for the timing bucket at a predetermined time, including determining a difference between a counter for the timing bucket at the predetermined time and the counter for the timing bucket at a time when the drive was replaced within the RAID configuration, comparing the delta-count for the timing bucket to a predetermined threshold, and determining whether the drive is lethargic, based on the comparing.

20 Claims, 4 Drawing Sheets

(56) References Cited

U.S. PATENT DOCUMENTS

| | | | |
|---|---|---|---|
| 8,566,637 B1 | 10/2013 | Puhov et al. | |
| 8,688,878 B1 | 4/2014 | Dolan et al. | |
| 8,743,610 B2 * | 6/2014 | Kim | G06F 13/4243 365/185.11 |
| 8,838,887 B1 | 9/2014 | Burke et al. | |
| 9,086,807 B2 | 7/2015 | Okada et al. | |
| 9,270,602 B1 * | 2/2016 | Mimms | H04L 47/21 |
| 9,454,431 B2 | 9/2016 | Grube et al. | |
| 9,747,042 B2 | 8/2017 | Kalos et al. | |
| 2008/0263274 A1 * | 10/2008 | Kishi | G06F 3/0623 711/114 |
| 2011/0225357 A1 | 9/2011 | Kishi et al. | |
| 2013/0205166 A1 * | 8/2013 | Nair | G06F 3/0611 714/6.23 |
| 2014/0026017 A1 | 1/2014 | Grube et al. | |
| 2017/0003888 A1 | 1/2017 | Kalos et al. | |

OTHER PUBLICATIONS

Kalos et al., U.S. Appl. No. 14/788,756, filed Jun. 30, 2015.
Non-Final Office Action from U.S. Appl. No. 14/788,756, dated Dec. 30, 2016.
Notice of Allowance from U.S. Appl. No. 14/788,756, dated Apr. 20, 2017.

* cited by examiner

STATISTIC-BASED ISOLATION OF LETHARGIC DRIVES

BACKGROUND

The present invention relates to storage arrays, and more specifically, this invention relates to identifying a lethargic drive within a storage array.

RAID (redundant array of independent disks) is a data storage approach that combines multiple storage drives into a single logical unit for purposes of increasing performance and/or data reliability. However, when a single drive in the array is slower than the others, it may negatively affect the performance of the whole array.

Modern RAID hardware receives a chain of operations that directs the storage and/or retrieval from individual drives of an array. When a chain of operations takes longer to complete than expected, it may not be possible to observe and time the operations directed to individual drives and determine whether a specific drive is responsible for the delay. Further complexity may arise when performance assists allow operations to be chained for update writes. Any drive in the chain may be the cause of the overall slow I/O.

Accordingly, isolating a lethargic drive (i.e., a drive that has a response time above an established norm) in a RAID configuration may be problematic. While drives that cause timeouts are easily identified because the failed command indicates the failing drive, a lethargic drive may be hidden by the RAID configuration.

In some systems, performance statistics may be accumulated for an array as a whole, so individual drive data is lost. Further, average response time data may be available, but lethargic drive responses may be concealed in an average response time view.

BRIEF SUMMARY

In one general embodiment, a method includes identifying a timing bucket unique to a drive located in a redundant array of independent disks (RAID) configuration, computing a delta-count for the timing bucket at a predetermined time, including determining a difference between a counter for the timing bucket at the predetermined time and the counter for the timing bucket at a time when the drive was replaced within the RAID configuration, comparing the delta-count for the timing bucket to a predetermined threshold, and determining whether the drive is lethargic, based on the comparing.

In another general embodiment, a computer program product is provided for identifying a lethargic drive. The computer program product comprises a computer readable storage medium having program instructions embodied therewith. The program instructions are executable by a processor to cause the processor to identify, by the processor, a plurality of timing buckets unique to a drive located in a redundant array of independent disks (RAID) configuration, for each of the plurality of timing buckets, compute, by the processor, a delta-count for the timing bucket at a predetermined time, including determining a difference between a counter for the timing bucket at the predetermined time and the counter for the timing bucket at a time when the drive was replaced within the RAID configuration, compare, by the processor, the delta-count for each of the plurality of timing buckets to a predetermined threshold, and determine, by the processor, whether the drive is lethargic, based on the comparison.

In another general embodiment, a system comprises a processor, and logic integrated with the processor, executable by the processor, or integrated with and executable by the processor. The logic is configured to identify a plurality of timing buckets unique to a drive located in a redundant array of independent disks (RAID) configuration, for each of the plurality of timing buckets, compute a delta-count for the timing bucket at a predetermined time, including determining a difference between a counter for the timing bucket at the predetermined time and the counter for the timing bucket at a time when the drive was replaced within the RAID configuration, compare the delta-count for each of the plurality of timing buckets to a predetermined threshold, and determine whether the drive is lethargic, based on the comparison.

Other aspects and embodiments of the present invention will become apparent from the following detailed description, which, when taken in conjunction with the drawings, illustrate by way of example the principles of the invention.

DETAILED DESCRIPTION

Figure 1:
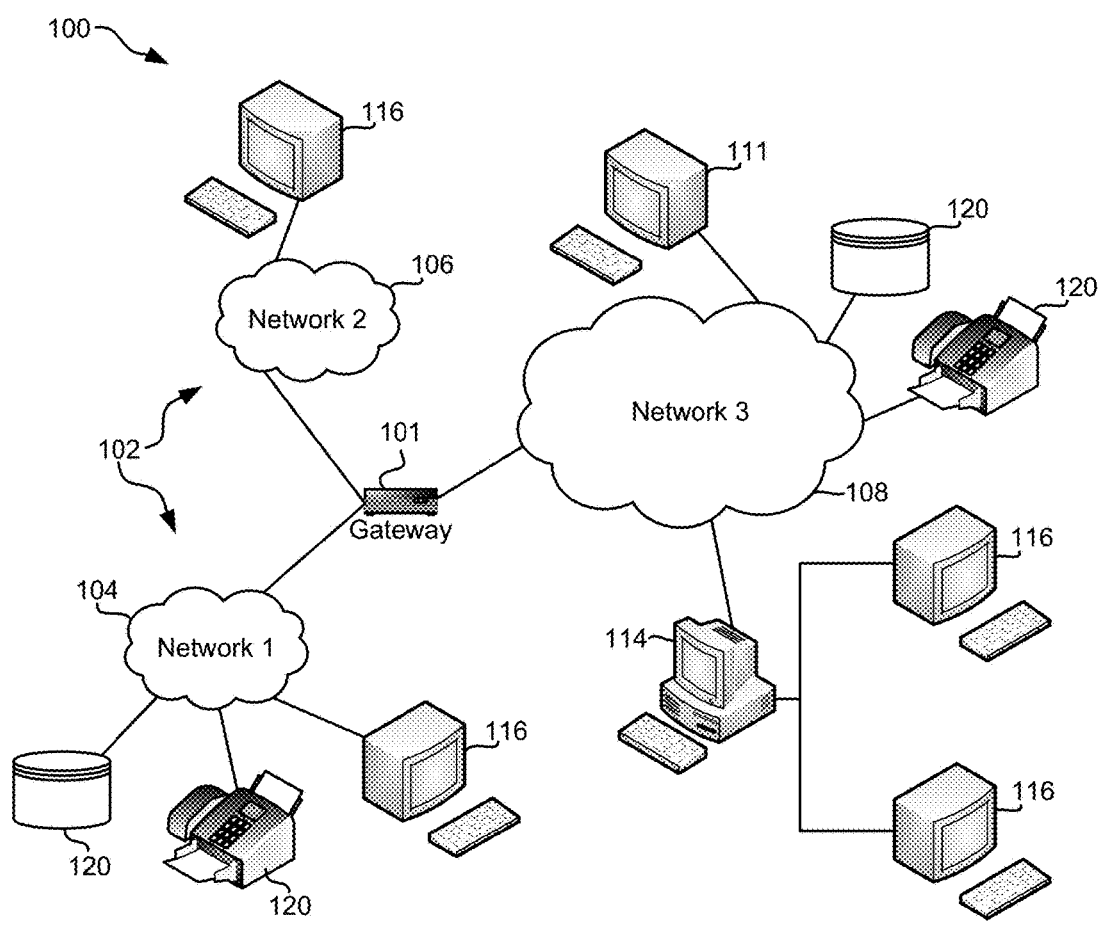
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for isolating a lethargic drive in a RAID configuration.

In one general embodiment, a method includes executing a command directed to at least two drives in a redundant array of independent disks (RAID) configuration, where each of the drives of the at least two drives is associated with a plurality of timing buckets. The method also includes determining a completion time of the command. Additionally, the method includes, for each of the at least two drives that the command was directed to, counting the completion time of the command in one of the timing buckets associated with the drive.

In another general embodiment, a computer program product is provided for identifying a lethargic drive. The computer program product comprises a computer readable storage medium having program instructions embodied therewith. The program instructions are executable by a processor to cause the processor to execute a command directed to at least two drives in a redundant array of independent disks (RAID) configuration, where each of the drives of the at least two drives is associated with a plurality of timing buckets. The program instructions are also executable by the processor to cause the processor to determine a completion time of the command, and, for each of the at least two drives that the command was directed to, count the completion time of the command in one of the timing buckets associated with the drive.

In another general embodiment, a system comprises a processor and logic integrated with and/or executable by the processor. The logic is configured to execute a command directed to at least two drives in a redundant array of independent disks (RAID) configuration, where each of the drives of the at least two drives is associated with a plurality of timing buckets. The logic is further configured to determine a completion time of the command, and for each of the at least two drives that the command was directed to, count the completion time of the command in one of the timing buckets associated with the drive.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
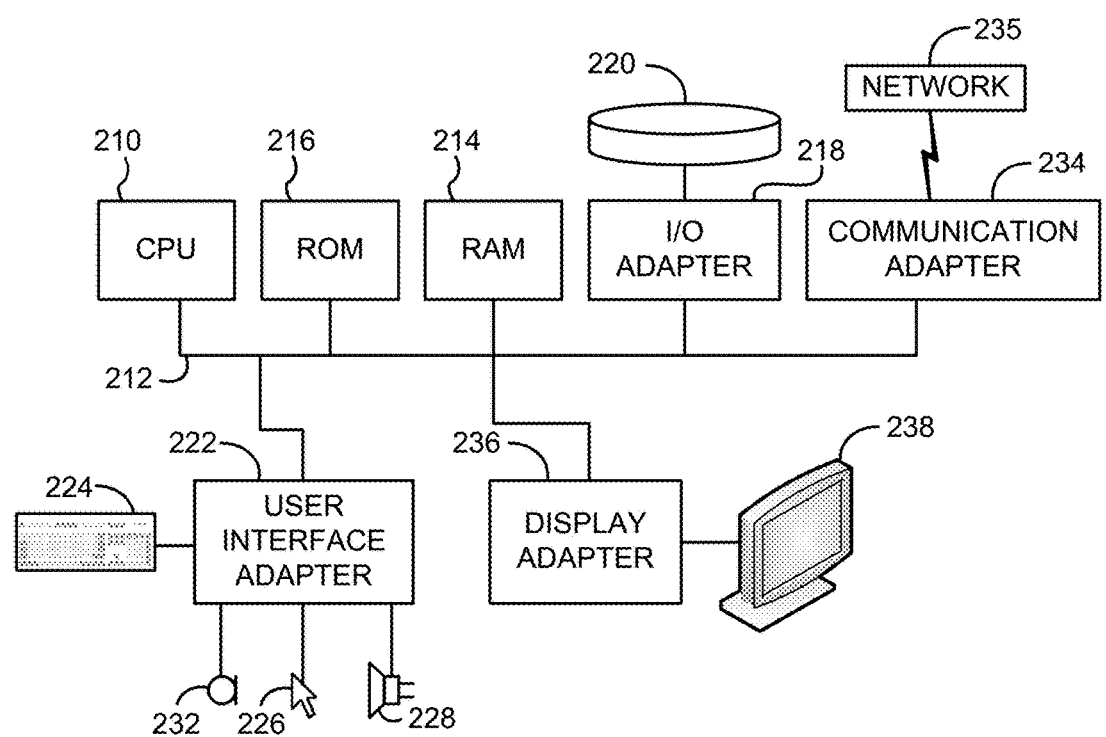
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
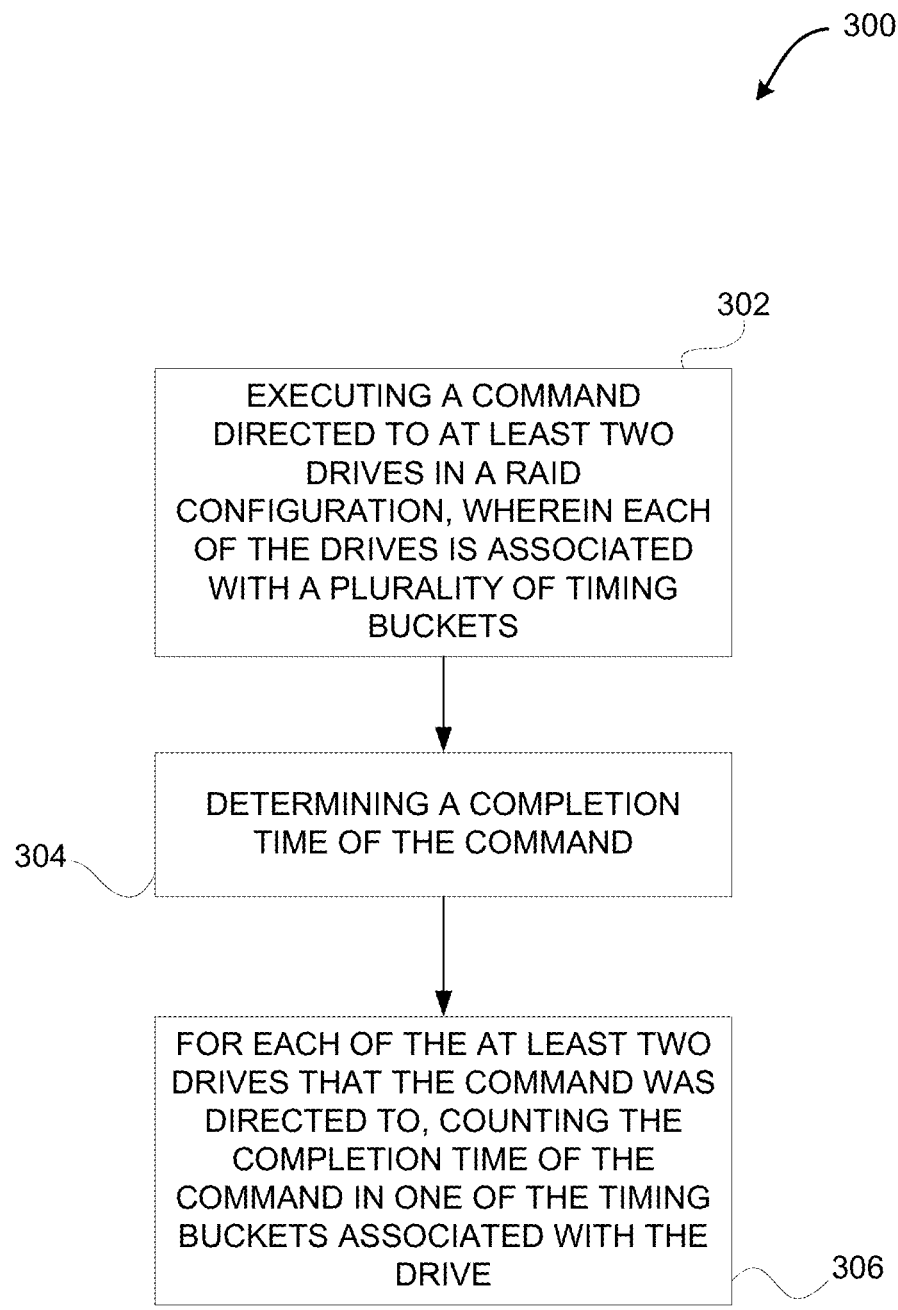
FIG. 3 illustrates a method for isolating a lethargic drive, in accordance with one embodiment.

Now referring to FIG. 3, a flowchart of a method 300 for isolating a lethargic drive, is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a RAID controller, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a command is executed. The executed command is directed to at least two drives in a RAID configuration. As noted below, the drives may be any type of storage device usable in a RAID configuration, e.g., solid state drives, hard disk drives, etc.

As used herein, a command may include any instruction to a device to cause the device to perform a specific task. Further, the command may be directed to a drive when it causes any I/O operation (e.g., a read, a write, a modify, etc.) on the drive. Thus, the command may be directed to the at least two drives of the RAID configuration when the command results in any I/O operations on the at least two drives. In one embodiment, the command may include instructions that cause reads and/or writes to one or more drives of the RAID configuration. The reads and/or writes to the one or more drives may include updates to parity information, such as parity blocks.

In one particular embodiment, the command directed to the at least two drives includes read operations that result in reading data blocks from two or more drives. In another embodiment, the command directed to the at least two drives includes a write operation that results in writing data blocks of one or more drives, and updating a parity block on one or more drives. For example, the command directed to the at least two drives may include a write operation to a data block of a first drive, and updating a parity block of a second drive. The parity block may track parity for all data blocks of a given stripe across drives of the array.

In some embodiments, the command directed to the at least two drives of the RAID configuration may include a chain of operations. For example, the chain of operations in the command may include: a first read operation to read one or more data blocks of a first drive, a second read operation to read one or more data blocks of a second drive, an XOR operation of the data blocks of the first drive and the data blocks of the second drive, and then writing the results of the XOR operation to a third drive.

In various embodiments, a drive includes any physical unit of storage that is capable of being combined with other physical units of storage to comprise a single logical unit. For example, the drives may include hard disk drives (HDDs), solid state drives (SSDs), volatile memory, non-volatile memory, etc. Accordingly, in various embodiments, the RAID configuration may include a single logical unit comprised of an association of multiple physical units. The single logical unit may be constructed for purposes of data redundancy and/or improving access performance.

Still yet, as shown at operation 302, each of the drives is associated with a plurality of timing buckets. As used herein, a timing bucket includes any logical construct capable of counting or tracking an integer. Additionally, each of the timing buckets of a drive may be associated with a different time interval. Further, all of the time intervals may be constructed with reference to a single baseline. For example, for a given drive, there may be a number different timing buckets associated with the drive. Additionally, each drive of the at least two drives may be associated with its own set of the number of different timing buckets.

In one particular example, for a given drive, there may be four timing buckets associated with the drive. The four timing buckets may include a first bucket associated with a time of >100 milliseconds (ms), a second bucket associated with a time of >250 ms, a third bucket associated with a time of >500 ms, and a fourth bucket associated with a time of >1 s. Further, each of the drives in the RAID configuration is associated with its own set of timing buckets. For example, for a given RAID configuration of three drives, there may be three >100 ms buckets, where each of the >100 ms buckets is associated with a respective drive.

Of course, such timing buckets are presented for the purposes of simplifying the present discussion, and it is contemplated that any number of timing buckets greater or less than four may be used for each drive.

Similarly, it is contemplated that the timing buckets may be associated with time intervals other than those presented above. For example, the timing buckets may be based on a 100 ms interval (e.g., >100 ms, >200 ms, >300 ms, >400 ms, >500 ms, >600 ms, . . . etc.), or may be based on a 200 ms interval (e.g., >200 ms, >400 ms, >600 ms >800 ms, . . . etc.), or any other timing interval.

In some embodiments, each of the time intervals may be considered to be a slow command time. For example in a system employing the four timing buckets of >100 ms, >250 ms, >500 ms, and >1 s, any command that exceeds 100 ms to complete execution may be considered a slow command.

Next, at operation 304, a completion time of the command is determined. The completion time of the command may include any calculated or measured amount of time that elapsed during performance of the command. In one embodiment, the completion of the time may include an elapsed time from receipt of the command to completion of execution of the command. In another embodiment, the completion time may include an elapsed time from beginning execution of the command to completion of execution of the command.

Further, at operation 306, for each of the at least two drives that the command was directed to, the completion time of the command is counted in one of the timing buckets associated with the drive. Counting the completion time in the one of the timing buckets associated with the drive may include incrementing a counter of the timing bucket. For example, if a command is directed to three drives of an array, then the completion time of the command is counted in three timing buckets—a corresponding timing bucket for each of the three drives. Counting the completion time of the command may include incrementing a counter associated with each of the three buckets.

As noted above, a chain of operations may result in reads and writes to a group of drives. Further, more than one of the drives may be involved in any particular operation. While an aggregate completion time of the command may be determined, in the case of a delay in execution of the command there may be no information available to indicate which of the drives is responsible for the delay.

However, it may be known which drives of the array were accessed during execution of a given command. By counting the completion time in timing buckets of every resource that might've been involved in execution of the command, then, over time, a lethargic drive may be identified as the drive with the highest timing bucket counts.

For a given command, the completion time of the command may be counted against the highest applicable bucket for each of the drives. As a specific example, in a system that maintains >100 ms, >250 ms, >500 ms, and >1 s timing buckets for each of the drives of a four-drive array, if a command is directed to three of the drives, and a completion time of a command is timed at 600 ms, then a >500 ms timing bucket of the first drive would be incremented, a >500 ms timing bucket of the second drive would be incremented, and a >500 ms timing bucket of the third drive would be incremented.

In other words, a command that affects multiple drives (e.g., includes chained operations, etc.) results in incrementing a timing bucket for each of the drives (e.g., each of the drives in the chain, etc.). Further, because the >500 ms timing bucket is the highest applicable timing bucket, only the >500 ms timing bucket is incremented, and the >100 ms timing bucket and the >250 ms timing bucket are not incremented.

In some embodiments, the timings of the buckets may be absolute. For example, in a system that maintains >100 ms, >250 ms, >500 ms, and >1 s timing buckets for each of the drives of an array, any command that takes between 100-250 ms to execute may be counted in the >100 ms timing buckets for each of the drives affected by the command.

In other embodiments, the timings of the buckets may be with respect to a baseline. For example, in a system that maintains >100 ms, >250 ms, >500 ms, and >1 s timing buckets for each of the drives of an array, and allows a 50 ms baseline for command execution, then any commands that require >100 ms over the baseline (i.e., >150 ms) to execute, may be counted in the >100 ms timing buckets for each of the drives affected by the command. Similarly, in the system that maintains >100 ms, >250 ms, >500 ms, and >1 s timing buckets for each of the drives of the array, and allows the 50 ms baseline for command execution, then any commands that require >250 ms over the baseline (i.e., >300 ms) to execute, may be counted in the >250 ms timing buckets for each of the drives affected by the command.

In various embodiments, the bucket data may be read. For example, the bucket data may be read periodically (e.g., every 8 hours, 24 hours, 72 hours, etc.). As used herein, the bucket data includes any and all timing bucket counts for the drives of an array. Further still, the bucket data may be stored or copied to a second location. For example, the bucket data may be stored or copied to a controller file in a system, a server, the cloud, etc. The bucket data may be stored or copied to the second location after each periodic reading. Moreover, the bucket data may be stored or copied to the second location for access and analysis by a client. By periodically offloading the bucket data and storing elsewhere, the bucket data may be maintained for extended periods of time, such as days, weeks, months, etc. The bucket data may be analyzed by computer logic or an individual to identify one or more lethargic drives in the RAID configuration.

Thresholds may be defined in some embodiments. The thresholds may cause automatic reporting of a drive that has excessive timing bucket counts. For example, the drive may be reported as a lethargic drive.

In one embodiment, a threshold may be with respect to all timing buckets for a drive, or for a single bucket of the drive. For example, a threshold may include a total number of counts in all buckets of the drive, or a total number of counts in one or more single buckets of the drive (e.g., the >500 ms bucket, etc.). In some embodiments, the threshold may be configured such that the higher delay timing buckets (e.g., the >500 ms bucket, >1 s timing bucket, etc.) are more heavily weighted than the lower delay timing buckets (e.g., >100 ms timing bucket, >250 ms timing bucket, etc.).

In another embodiment, the threshold may be with respect to a total cumulative delay reflected by the counts in the timing buckets. For example, a drive with three >100 ms timing bucket counts, two >250 ms timing bucket counts, and one >500 ms timing bucket count, may be associated with a total cumulative delay of >1300 ms, which would be in excess of a 1000 ms cumulative delay threshold.

Still yet, in some embodiments, a threshold may be set with respect to other drives in the array. For example, a threshold may be set with respect to a number of counts in one or more of the timing buckets of a given drive with respect to the timing buckets of other drives in the array. For example, a threshold may be configured to report a drive with 10+ more timing bucket counts than any other drive in its RAID configuration. In this manner, the thresholds may be defined to allow automatic reporting of a drive that has excessive counts compared to other drives in the array.

In a typical RAID configuration, where data is striped across all drives in the array, and one or more units of each stripe is reserved to hold parity data calculated from the other units in the stripe (e.g., RAID-5, RAID-6, etc.), the parity units are distributed or rotated throughout the array. Accordingly, a given update operation (e.g., a write or modify operation, etc.) may have an equal chance of hitting any of the drives. However, any update operation also results in an update to the parity unit. Thus, when a parity unit for a stripe is stored on a lethargic drive, and data for the stripe is uniformly distributed across the other drives of the array, then an update to any of the data units in the stripe will result in an update to the parity unit on the lethargic drive. Accordingly, the lethargic drive storing the parity unit will receive more updates than any other single drive. This may result in a great number of delayed commands.

Conversely, when a lethargic drive stores a data unit for a given stripe, the parity unit for the stripe may be stored on a non-lethargic (i.e., operationally normal) drive. In this way, only operations that directly affect the data (e.g., data reads, data writes, and data updates, etc.) on the lethargic drive will be delayed.

Because RAID configurations are generally configured to equally distribute access over the entirety of the array, all resources may be hit in different combinations over an extended period of time. In one embodiment, where n timing bucket counts accumulate over time against a given lethargic drive in a RAID configuration, the timing bucket counts accumulated over time against the other drives of the RAID configuration may approximate (n/w), where w is a width of the array. In other words, the accumulated timing bucket counts may be distributed uniformly over the remaining drives of the array.

Accordingly, as timing bucket counts are accumulated in the timing buckets for the drives of the array, one or more lethargic drives that are responsible for unexpected delays may be identified.

In some embodiments, automation logic or code may fail the lethargic drive without human intervention based on a combination of a differential count, a threshold, and maintaining the differential count over a predefined period of time. For example, the lethargic drive may be failed when it maintains a timing bucket count that is 10+ greater than any other drive in the array for a period of 12 hours. The predefined period of time may be set by a user, such as an administrator.

In the various embodiments discussed herein, a drive that is operating below a standard or expected level of operation may slow the execution of commands on a RAID configuration. Tracking the completion time of commands in timing buckets may serve to identify the lethargic drive within the array. A drive with excessive counts in its timing buckets may be a lethargic drive, where the lethargic drive negatively impacts data access in some stripes of the RAID configuration, and negatively impacts parity updates in others.

Further, a drive with an excessive bucket count may be replaced. In one embodiment, after replacing a lethargic drive, the timing buckets may be reset for the drives of the array. In another embodiment, after replacing a lethargic drive in an array, the timing buckets may not be reset, and may continue to be incremented based on the execution time of commands against the array. At a subsequent time, delta-counts may be computed for the timing buckets of the drives of the array, where the delta-counts are differences between timing bucket counts at the subsequent time and the time when the drive was replaced.

The delta-counts may be used to identify the presence of a lethargic drive within the array in the same manner as described above with respect to the counts in the timing buckets. The use of delta-counts for the drives may allow for the identification of a lethargic drive (e.g., by comparing the delta-counts to thresholds discussed above, etc.) while avoiding the skewing of a particular drive's timing bucket counts due to influence from a removed lethargic drive. For example, if a data block on a given drive is frequently updated, and a replaced lethargic drive previously maintained a parity block for the stripe of the data block, then the given drive may have accumulated a number of timing bucket counts due to the lethargic drive. When the lethargic drive is eventually replaced, the given drive may cease accumulating counts in its timing buckets. Despite the given drive's high number of timing buckets counts, a periodic evaluation of delta-counts of the given drive, and comparison to a threshold, may be utilized to ensure that the given drive is not also lethargic. In one particular embodiment, the delta-counts may be determined and compared to a threshold every 6-10 hours.

Figure 4:
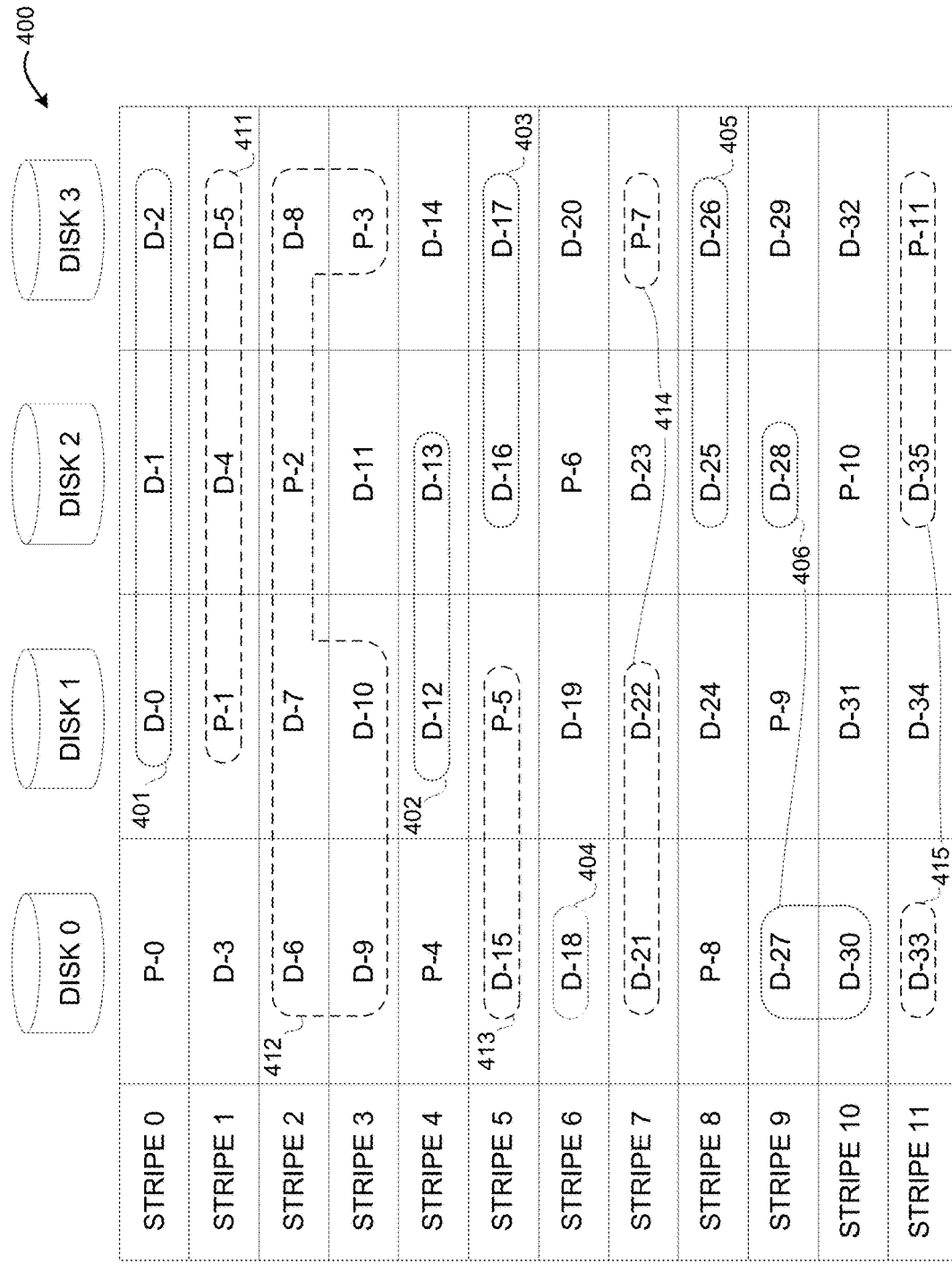
FIG. 4 illustrates commands executing against a RAID configuration, in accordance with another embodiment.

Referring now to FIG. 4, a diagrammatic layout of commands executing against a RAID configuration 400 is shown, in accordance with one embodiment. As an option, the present RAID configuration 400 may be implemented in conjunction with features from any other embodiment listed herein, such as those described with reference to the other FIGS. Of course, however, such RAID configuration 400 and others presented herein may be used in various applications and/or in permutations which may or may not be specifically described in the illustrative embodiments listed herein. Further, the RAID configuration 400 presented herein may be used in any desired environment.

As shown in FIG. 4, four drives (disk 0, disk 1, disk 2, and disk 3) in a RAID-5 configuration generally comprise the RAID 400. Further, for purposes of simplicity, the array 400, is shown within FIG. 4 to comprise twelve stripes (stripes 0-11) spread across the four drives. In particular, each of the stripes is shown to include a parity block, and three data blocks. For example, stripe 0 is shown to include parity block P-0 maintained on disk 0, and data blocks D-0, D-1, and D-2, maintained on disk 1, disk 2, and disk 3, respectively. Similarly, stripe 11 is shown to include data blocks D-33, D-34, and D-35, maintained on disk 0, disk 1, and disk 2, respectively; as well as parity block P-11 maintained on disk 3. Within the RAID configuration 400, the parity blocks and data blocks are evenly distributed across the four drives. In other words, amongst the 12 illustrated stripes, each drive stores 9 data blocks and 3 parity blocks.

Additionally, FIG. 4 is shown to illustrate the target blocks of read and/or write operations due to a plurality of commands 401-415. For the purposes of the present illustration, the commands 401-406 are illustrated to include read operations. Accordingly, as illustrated within FIG. 4, the commands 401-406 that include only read operations are shown to access only data blocks. For example, the command 402 is shown to access data blocks D-12 and D-13, of disk 1 and disk 2, respectively.

As illustrated within FIG. 4, the commands 411-415 are illustrated as including write operations. For example, the command 411 may include a read operation of data block D-4 and a write operation to data block D-5, which results in an update to parity block P-1. Similarly, a write or update operation to data block D-21 and/or data block D-22 results in an update to the parity block P-7 during execution of command 414.

For purposes of simplicity, the commands 401-415 are illustrated as being non-overlapping. In other words, none of the commands 401-415 are shown to read or write a data block or parity block that has previously been read or written by another of the commands 401-415. This is simply to aid in the instant description, and it is understood that read or write access of commands is not intended to be limited in any manner. For example, it is contemplated that a first command may included a first chain of operations that affect a plurality of data blocks and/or parity blocks, and some subset of those data blocks and/or parity blocks may be accessed during a subsequent command including a second chain of operations.

With continued reference to FIG. 4, execution of each of the commands 401-415 against RAID configuration 400 has been characterized within Table 1.

TABLE 1

| COMMAND # | DISKS INVOLVED | TYPE | TIME > ALLOWED |
|---|---|---|---|
| 401 | 1, 2, 3 | R | >250 ms |
| 402 | 1, 2 | R | >100 ms |
| 403 | 2, 3 | R | — |
| 404 | 0 | R | — |
| 405 | 2, 3 | R | — |
| 406 | 0, 2 | R | >100 ms |
| 411 | 2, 3, (1) | R/W | >500 ms |
| 412 | 0, 1, 3, (2), (3) | R/W | >1 s |
| 413 | 0, (1) | R/W | — |
| 414 | 0, 1, (3) | R/W | — |
| 415 | 0, 2, (3) | R/W | >250 ms |

As illustrated by Table 1, multiple commands have been executed with a completion time that is greater than desired. Specifically, the commands 401, 402, 406, 411, 412, and 415 have been executed with a completion time that is greater than allowed. As noted above, each time a command executes with a completion time that is greater than allowed, the completion time of the command may be counted in a timing bucket for each drive that the command is directed to. In other words, the completion time of the command may be counted in a timing bucket for each drive that the command is known to perform I/O operations on.

For example, the command 401 is characterized as a command including only read operations that are directed to data blocks of disk 1, disk 2, and disk 3. Moreover, a completion time of the command 401 was determined to count against a >250 ms timing bucket for each of disk 1, disk 2, and disk 3.

For illustrative purposes only, each of the disks 0-3 is associated with its own corresponding set of the following timing buckets: >100 ms, >250 ms, >500 ms, and >1 s. As noted above, the disks may be associated with greater than or fewer than four timing buckets, as well as timing buckets associated with other timing intervals.

Referring again to FIG. 4 and Table 1, the command 411 is characterized as a command including read/write operations that are directed to data blocks of disks 2 and 3, as well as a parity block of disk 1. A completion time of the command 411 was determined to count against a >500 ms timing bucket for each of disk 1, disk 2, and disk 3. Similarly, the command 412 is characterized as a command including read/write operations that are directed to data blocks of disks 0, 1, and 3, as well as parity blocks of disks 2 and 3. Additionally, a completion time of the command 412 was determined to count against a >1 s timing bucket for each of disk 0, disk 1, disk 2, and disk 3.

Table 2 shows an accumulation of counts for the timing buckets for each of the disks 0-3 of FIG. 4. Table 2 also shows a cumulative time for each of the disks 0-3 based upon the counts of the timing buckets.

TABLE 2

| DISK # | >100 ms | >250 ms | >500 ms | >1 s | CUMULATIVE TIME |
|---|---|---|---|---|---|
| DISK 0 | 1 | 1 |   | 1 | >1350 ms |
| DISK 1 | 1 | 1 | 1 | 1 | >1850 ms |
| DISK 2 | 2 | 2 | 1 | 1 | >2200 ms |
| DISK 3 |   | 2 | 1 | 1 | >2000 ms |

As shown in Table 2, disk 2 has an accumulated count of 2 in the >100 ms timing bucket, an accumulated count of 2 in the >250 ms timing bucket, an accumulated count of 1 in the >500 ms timing bucket, and an accumulated count of 1 in the >1 s timing bucket. Further, disk 2, based on the accumulated counts in the timing buckets, is associated with a cumulative time delay of >2200 ms. The accumulated counts and cumulative time of disk 2 are greater than the accumulated counts and cumulative time for the other disks 0, 1, and 3.

Accordingly, based on the timing bucket counts, it may be determined that disk 2 is a lethargic drive that is negatively impacting the performance of the array 400. Further, disk 2 may be identified as the lethargic drive in the array 400 despite the fact that all commands directed to disk 2 included chain operations directed to disks other than disk 2. Accordingly, using the methods and systems described above, a lethargic drive within a RAID configuration may be identified even without the ability to time operations directed to individual drives.

Still yet, it should be noted that the command 405 is characterized as a command including read operations that are directed to data blocks of disk 2 and disk 3. Moreover, a completion time of the command 405 was determined to not count against any timing buckets for disk 2 or disk 3. Accordingly, although disk 2 has been characterized as a lethargic drive in the array 400, it is understood not all I/O operations on disk 2 may be affected by its status. In other words, not all I/O operations on a lethargic drive may be sufficiently delayed to increase a count of one or more timing buckets.

Disk 2 may be identified as a lethargic drive by a user that analyzes the timing bucket data of the disks of the array 400, or by automated logic that analyzes the timing bucket data of the disks of the array 400. In response to identifying disk 2 as a lethargic drive, disk 2 may be replaced by another disk. Moreover, continued monitoring of the array 400 may be employed to determine whether the accumulated counts in the timing buckets of disk 3 also indicate disk 3 as being a lethargic disk, or instead indicate that the accumulated counts in the timing buckets of disk 3 were being skewed by commands including chained operations that were directed to both lethargic disk 2 and disk 3. This may be done using some combination of delta-counts and thresholds, as discussed above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying a timing bucket unique to a drive located in a redundant array of independent disks (RAID) configuration;
   computing a delta-count for the timing bucket at a predetermined time, including determining a difference between a counter for the timing bucket at the predetermined time and the counter for the timing bucket at a time when the drive was replaced within the RAID configuration;
   comparing the delta-count for the timing bucket to a predetermined threshold; and
   conditionally identifying the drive as lethargic, based on the comparing.

2. The method of claim 1, wherein the timing bucket is associated with a predetermined time interval.

3. The method of claim 1, wherein the counter for the timing bucket indicates a number of times a completion time of a prior command directed to the drive matched a predetermined time interval associated with the timing bucket, the completion time including a time to completion of an execution of the prior command.

4. The method of claim 1, wherein the drive is identified as lethargic when the delta-count for the timing bucket exceeds the predetermined threshold.

5. The method of claim 1, wherein the comparing is performed on a predetermined periodic basis.

6. The method of claim 1, further comprising identifying a plurality of timing buckets unique to the drive.

7. The method of claim 6, wherein each of the plurality of timing buckets of the drive is associated with a different time interval.

8. The method of claim 6, further comprising computing the delta-count for each of the plurality of timing buckets at the predetermined time.

9. The method of claim 8, further comprising comparing the delta-count for all of the plurality of timing buckets to the predetermined threshold.

10. The method of claim 8, further comprising determining a total cumulative delay based on the delta-count for each of the plurality of timing buckets at the predetermined time, and comparing the total cumulative delay to a cumulative delay threshold.

11. A system, comprising:
a processor; and
logic integrated with the processor, executable by the processor, or integrated with and executable by the processor, the logic being configured to:
identify a plurality of timing buckets unique to a drive located in a redundant array of independent disks (RAID) configuration;
for each of the plurality of timing buckets, compute a delta-count for the timing bucket at a predetermined time, including determining a difference between a counter for the timing bucket at the predetermined time and the counter for the timing bucket at a time when the drive was replaced within the RAID configuration;
compare the delta-count for each of the plurality of timing buckets to a predetermined threshold; and
conditionally identify the drive as lethargic, based on the comparison.

12. A computer program product for identifying a lethargic drive, the computer program product comprising a computer readable storage medium having program instructions embodied therewith, the program instructions executable by a processor to cause the processor to:
identify, by the processor, a plurality of timing buckets unique to a drive located in a redundant array of independent disks (RAID) configuration;
for each of the plurality of timing buckets, compute, by the processor, a delta-count for the timing bucket at a predetermined time, including determining a difference between a counter for the timing bucket at the predetermined time and the counter for the timing bucket at a time when the drive was replaced within the RAID configuration;
compare, by the processor, the delta-count for each of the plurality of timing buckets to a predetermined threshold; and
conditionally identify, by the processor, the drive as lethargic, based on the comparison.

13. The computer program product of claim 12, wherein each of the plurality of timing buckets is associated with a predetermined time interval.

14. The computer program product of claim 12, wherein the counter for each of the plurality of timing buckets indicates a number of times a completion time of a prior command directed to the drive matched a predetermined time interval associated with the timing bucket, the completion time including a time to completion of an execution of the prior command.

15. The computer program product of claim 12, wherein the drive is identified as lethargic when the delta-count for one of the plurality of timing buckets exceeds the predetermined threshold.

16. The computer program product of claim 12, wherein the comparison is performed on a predetermined periodic basis.

17. The computer program product of claim 12, further comprising program instructions executable by a processor to cause the processor to identify a plurality of timing buckets unique to the drive, utilizing the processor.

18. The computer program product of claim 17, wherein each of the plurality of timing buckets of the drive is associated with a different time interval.

19. The computer program product of claim 17, further comprising program instructions executable by a processor to cause the processor to compute the delta-count for each of the plurality of timing buckets at the predetermined time, utilizing the processor.

20. The computer program product of claim 19, further comprising program instructions executable by a processor to cause the processor to compare the delta-count for all of the plurality of timing buckets to the predetermined threshold, utilizing the processor.

* * * * *